Patented Mar. 12, 1940

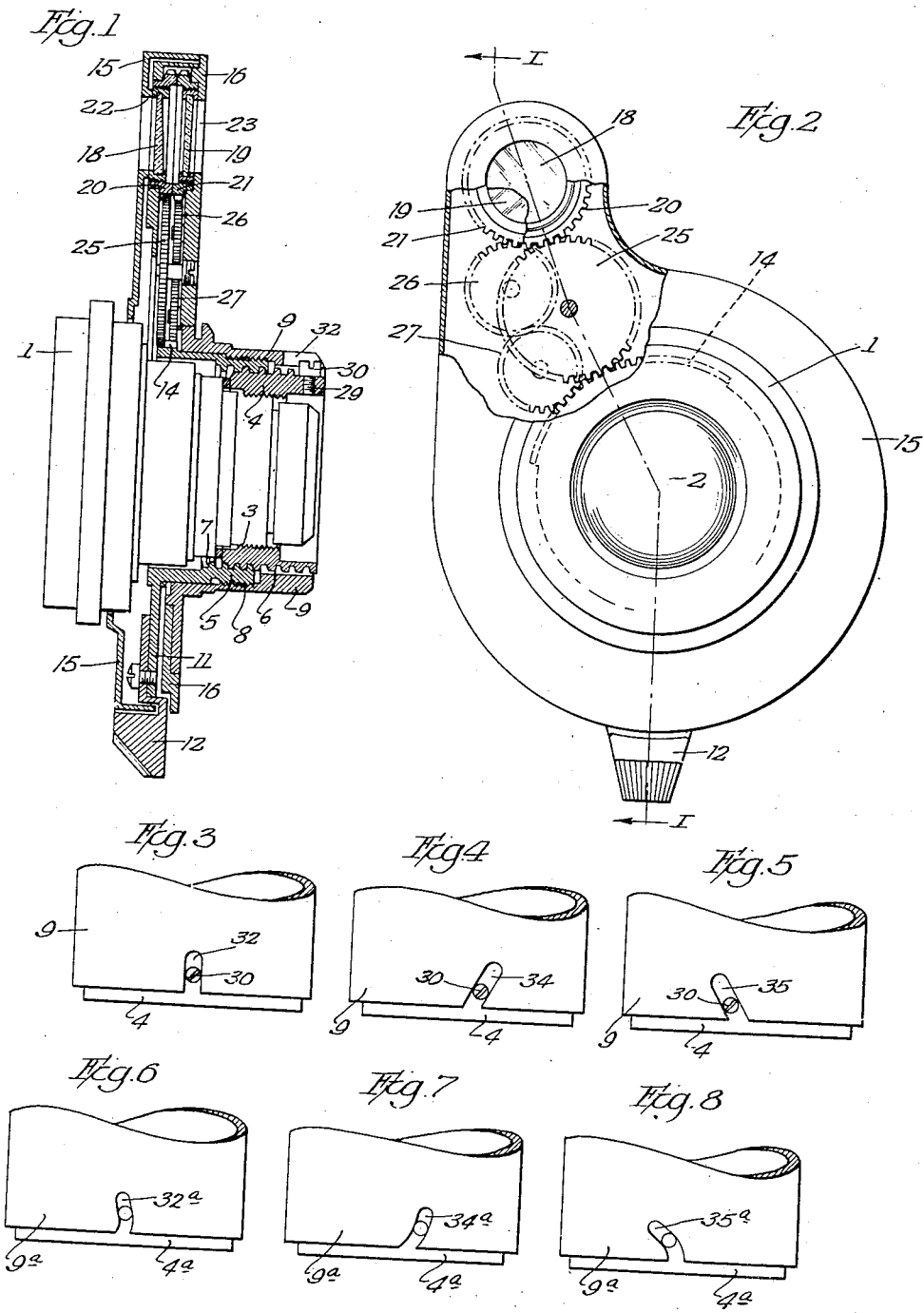

2,193,459

UNITED STATES PATENT OFFICE 2,193,459

PHOTOGRAPHIC OBJECTIVE MOUNT

Heinz Küppenbender, Dresden, Germany, assignor to Zeiss Ikon Aktiengesellschaft, Dresden, Germany Application January 18, 1939, Serial No. 251,513
In Germany January 28, 1938

9 Claims. (Cl. 95—44)

This invention relates to improvements in photographic objective mounts and in particular is directed to photographic objective mounts coupled with a base range finder.

It is well known to employ in photographic cameras a photographic objective whose adjusting means for focusing is coupled with the ray reflecting means of a range finder. It is also known to employ a ray deflecting means consisting of two axially alined rotary optical wedges, which are rotatably adjusted simultaneously in opposite direction. The optical wedges are usually adjusted about their common axis by a gear on a threaded sleeve, which upon rotation adjusts also the photographic objective in axial direction. The optical wedges may also be provided directly with a manually operable adjusting member and in turn are used to rotate the threaded sleeve for focusing the photographic objective.

It is the principal object of the invention to reduce the errors in adjustment, which are produced in a combination of this type, due to the differences or tolerances in the focal length of the photographic objective and in the deflection of the measuring rays by the rotary optical wedges. This is accomplished by providing the threaded sleeve, which normally is guided for its axial movement by means of a straight axial slot in a stationary member, with selectively employable guiding means comprising inclined slots in said stationary member. The inclined slots are used in those cases, where at predetermined values of the paired focal length and measuring ray deflection the errors of adjustment exceed the permissible degree. If a photographic objective having a too large focal length is used together with a pair of optical wedges having a too large deflection, then the threaded sleeve in which the objective is mounted is guided by an inclined slot which gives the objective an additional axial displacement. If, however, a photographic objective having a too small focal length is paired with optical wedges having a too small deflection, then the objective supporting sleeve is guided by an inclined slot which will reduce the axial displacement of the objective.

Another object of the invention is to provide the photographic objective mount with slots of curved shape for guiding the axial displacement of the objective.

Other objects of the invention will be apparent or will be pointed out specifically in the description forming a part of this specification. The invention is not limited to the embodiments of the invention herein described, as various other forms may be adopted within the scope of the claims.

Referring to the drawing:

Fig. 1 is a cross-sectional view of the adjusting device for the ray deflecting means and the photographic objective along the line I—I of Fig. 2, the photographic objective barrel being shown in side elevation.

Fig. 2 is a front elevation view of the device, with certain parts broken away.

Figs. 3 to 5 illustrate diagrammatically the various guiding positions of the axially adjustable objective within its stationary bearing sleeve, and the Figs. 6 to 8 illustrate diagrammatically a modified embodiment of the guiding means for the objective in different positions.

According to Fig. 1 the objective barrel 1 containing the photographic objective 2 (Fig. 2) is securely attached by a thread 3 in a sleeve 4 which is axially shiftable in a rotatable operating sleeve 5. The sleeve 4 is provided with an exterior thread 6 engaging an interior thread 7 of the operating sleeve 5. The operating sleeve 5 in turn is rotatably mounted by a fine thread 8 of very low pitch in a stationary bearing sleeve 9, which, in a manner not shown, is attached to the camera casing. The operating sleeve 5 is provided with a radial arm 11 on whose outer end is attached a finger piece 12 adapted to be engaged by the operator for focusing the objective 2 by rotating the operating sleeve 5, thus causing an axial adjustment of the threaded sleeve 4.

With reference to Figs. 1 and 2, it will be noted that the operating sleeve 5 is provided with a gear segment 14 for operating the ray deflecting means of the base range finder. This ray deflecting means is mounted in a casing consisting substantially of two parts 15 and 16 attached to and surrounding the stationary bearing sleeve 9. The ray deflecting means comprises two optical wedges 18 and 19 mounted fixedly in axially alined annular gears 20 and 21 respectively, which are rotatably mounted in the casing between two axial alined windows 22 and 23. The annular gear 20 meshes with a gear 25, which in turn engages the gear segment 14 on the sleeve 5. The annular gear 21 meshes with a gear 26 driven by a gear 27 meshing with the gear segment 14. In this manner the optical wedges 18 and 19 are simultaneously rotatably adjusted in opposite direction when the operating sleeve 5 is rotated for focusing the objective 2.

In order to prevent a rotation of the sleeve 4 which carries the objective barrel 1, when the operating sleeve 5 is rotatably adjusted, the sleeve 4 has attached thereto a radial projection, which in the present case consists of a screw 29, the head 30 of which extends into a straight axial slot 32 of the stationary bearing sleeve 9 (Figs. 1 and 3).

In addition to the straight guide slot 32 the bearing sleeve 9 is also provided with two oppositely inclined guide slots 34 and 35 respectively, which selectively may be used for receiving the head 30 of the screw 29 whereby the axial displacement of the photographic objective 2 is modified by an additional rotative movement, so as to compensate any errors of adjustment due to differences in the focal length of the objective and the deflective power of the pair of optical wedges. If the head 30 of the screw 29 projects into the inclined slot 34 the photographic objective, in addition to its axial displacement caused by a rotative adjustment of the operating sleeve 5 is additionally displaced owing to the pitch of the slot 34. If, however, the head 30 of the screw 29 projects in the oppositely inclined slot 35, the photographic objective is displaced somewhat less axially as normally when the head 30 is guided by the axial slot 32, owing to the opposite pitch of the slot 35.

The Figs. 6 to 8 disclose another embodiment of an adjustable objective mount, in which the arial slot 32ª (Fig. 6) of the stationary bearing sleeve 9ª has a curved shape to guide the objective support 4ª during focusing properly so that the errors of adjustment remain within permissible limits. In such a mount the other slots 34ª and 35ª which as a whole are arranged at an angle with respect to the axis of the objective are likewise curved as illustrated in the Figs. 7 and 8. Obviously, the slots may have any desired shape, as may be determined by calculations or experiments to give a proper correction of the axial displacement of the photographic objective with respect to the deflective power of the rotary optical wedges. What I claim as my invention is:

1. The combination with a photographic objective, of ray deflecting means for a base range finder, said ray deflecting means comprising two axially alined rotary optical wedges, stationary means for adjustably supporting said objective and said rotary wedges, a manually rotatable member operatively connected with said objective by a thread and with said rotary wedges by a gearing for simultaneously adjusting said objective in axial direction and rotating said optical wedges about their common axis in opposite direction, and a pin and slot connection between said objective and said stationary means for causing said objective to move in axial direction when said manually rotatable member is rotated, the slot of said pin and slot connection being arranged at such an angle to the objective axis that said objective is axially moved in addition to the axial movement it receives by virtue of said thread when said manually rotatable member is rotated, so that the errors are compensated which are due to tolerances in the focal length of the objective and the deflection of the measuring rays by said rotary wedges.

2. The combination with a photographic objective, of ray deflecting means for a base range finder, said ray deflecting means comprising two axially alined rotary optical wedges, stationary means for adjustably supporting said objective and said optical wedges, a manually operable member operative connected with said objective by a thread and with said optical wedges by a gearing for simultaneously adjusting said objective in axial direction and rotating said optical wedges about their common axis in opposite direction, and a projection on said objective, said stationary means being provided with a slot in which said projection extends for guiding said objective during its adjustment in axial direction said slot of said pin and slot connection being arranged at such an angle to the objective axis that said objective is axially moved in addition to the axial movement it receives by virtue of said thread when said manually rotatable member is rotated, so that the errors are compensated which are due to tolerances in the focal length of the objective and the deflection of the measuring rays by said rotary wedges.

3. The combination with a photographic objective, of ray deflecting means for a base range finder, said ray deflecting means comprising two axially alined rotary optical wedges, stationary means for adjustably supporting said objective and said rotary wedges, a manually rotatable member operatively connected with said objective by a thread and with said rotary wedges by a gearing for simultaneously adjusting said objective in axial direction and rotating said optical wedges about their common axis in opposite direction, and a radial pin on sad objective, said stationary means being provided with a plurality of slots for selectively receiving said pin and guiding said objective during its axial adjustment, each said slot extending at a different angle to the axis of said objective and being adapted to impart to said objective an axial movement in addition to the axial movement caused by said thread, whereby the errors are compensated which are due to tolerances in the focal length of the objective and the deflection of the measuring rays by said rotary wedges.

4. The combination with a photographic objective, of ray deflecting means for a base range finder, said ray deflecting means comprising two axially alined rotary optical wedges, stationary means for adjustably supporting said objective and said rotary wedges, a manually rotatable member operatively connected with said objective by a thread and with said rotary wedges by a gearing for simultaneously adjusting said objective in axial direction and rotating said optical wedges about their common axis in opposite direction, and a radial pin on said objective, said stationary means being provided with a plurality of slots for selectively receiving said pin and guiding said objective during its axial adjustment, one of said slots extending parallel to the axis of said objective and causing said objective to be axially moved in accordance with the pitch of said thread and two other slots extending at a predetermined angle to the axis of said objective and in opposite direction for imparting to said objective an axial movement in a forward and rearward direction respectively, in addition to the axial movement caused by said thread, whereby the errors are compensated which are due to the tolerance in the focal length of the objective and the deflection of the measuring rays by the said rotary wedges.

5. The combination with a photographic objective, of ray deflecting means for a base range finder, said ray deflecting means comprising two axially alined rotary optical wedges, stationary means for adjustably supporting said objective and said rotary wedges, a manually rotatable member, means operatively connecting said manually operable member with said objective and said rotary wedges for simultaneously adjusting said objective in axial direction and rotating said optical wedges about their common axis in opposite direction, and means for slidably connecting said objective with said stationary means, said slidable connecting means controlling the axial adjustment of said objective with respect to the rotary adjustment of the said rotary wedges by imparting to said objective an axial movement in addition to the one effected by the operative connection between said manually rotatable member and said objective so as to coordinate the deflection of the measuring rays caused by the latter with the focal length of said objective.

6. The combination with a photographic objective, of ray deflecting means for a base range finder, said ray deflecting means comprising two axially alined rotary optical wedges, stationary means for adjustably supporting said objective and said rotary wedges, a manually rotatable member, means operatively connecting said manually operable member with said objective and said rotary wedges for simultaneously adjusting said objective in axial direction and rotating said optical wedges about their common axis in opposite direction, and means for slidably connecting said objective with said stationary means, said slidable connecting means being adapted to be selectively adjusted to a number of different operative positions for controlling the axial adjustment of said objective with respect to the rotary adjustment of the said rotary wedges by imparting to said objective an axial movement in addition to the one effected by the operative connection between said manually rotatable member and said objective so as to coordinate the deflection of the measuring rays caused by the latter with the focal length of said objective.

7. The combination with a photographic objective, of ray deflecting means for a base range finder, said ray deflecting means comprising two axially alined rotary optical wedges, a casing provided with a bearing sleeve, said rotary wedges being mounted in said casing, a manually rotatable operating sleeve having an interior thread rotatably mounted within said bearing sleeve, said photographic objective being provided with a lens barrel having an exterior thread engaging the interior thread of said operating sleeve, gear teeth on said operating sleeve, means operatively connecting said gear teeth with said rotary wedges for rotatably adjusting the latter about their common axis in opposite direction when said operating sleeve is rotatably adjusted, and a pin and slot connection between said objective and said bearing sleeve for causing said objective to move in axial direction upon said rotative adjustment of said operating sleeve the slot of said pin and slot connection being arranged at such an angle to the objective axis that the errors are compensated which are due to tolerances in the focal length of the objective and the deflection of the measuring rays by said rotary wedges.

8. The combination with a photographic objective, of ray deflecting means for a base range finder, a casing for supporting said objective and said ray deflecting means, a manually operable member rotatably mounted in said casing and operatively connected with said objective and said ray deflecting means for simultaneously adjusting said objective in axial direction and said ray deflecting means, and a pin and slot connection between said objective and said casing for causing said objective to move in axial direction when said manually operable member is rotated the slot of said pin and slot connection being arranged at such an angle to the objective axis that the errors are compensated which are due to tolerances in the focal length of the objective and the deflection of the measuring rays by said rotary wedges.

9. The combination with a photographic objective, of ray deflecting means for a base range finder, a casing provided with a bearing sleeve, said ray deflecting means being mounted axially spaced from said bearing sleeve in said casing, a manually operable operating sleeve having an interior thread rotatably mounted within said bearing sleeve, said photographic objective being provided with a lens barrel having an exterior thread engaging the interior thread of said operating sleeve, gear teeth on said operating sleeve, means operatively connecting said gear teeth with said ray deflecting means for adjusting the latter when said operating sleeve is rotatably adjusted, and a pin and slot connection between said objective and said bearing sleeve for causing said objective to move in axial direction upon said rotative adjustment of said operating sleeve the slot of said pin and slot connection being arranged at such an angle to the objective axis that the errors are compensated which are due to tolerances in the focal length of the objective and the deflection of the measuring rays by said rotary wedges.

HEINZ KÜPPENBENDER.